United States Patent
Montgomery et al.

(10) Patent No.: US 11,933,675 B2
(45) Date of Patent: Mar. 19, 2024

(54) SYSTEM AND METHOD FOR MULTI-CHANNEL PYROMETER ALLOWING NON-CONTACT TEMPERATURE MEASUREMENTS DOWN TO 800 K ON THE MICROSECOND SCALE

(71) Applicant: Lawrence Livermore National Security, LLC, Livermore, CA (US)

(72) Inventors: Jeffrey Montgomery, Livermore, CA (US); Magnus Lipp, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 876 days.

Patent file contains an affidavit/declaration under 37 CFR 1.130(b).

(21) Appl. No.: 16/429,888

(22) Filed: Jun. 3, 2019

(65) Prior Publication Data

US 2020/0018651 A1    Jan. 16, 2020

Related U.S. Application Data

(60) Provisional application No. 62/698,657, filed on Jul. 16, 2018.

(51) Int. Cl.
*G01J 5/0831* (2022.01)
*G01J 5/08* (2022.01)
(Continued)

(52) U.S. Cl.
CPC ........... *G01J 5/0831* (2013.01); *G01J 5/0802* (2022.01); *G01J 5/0803* (2013.01); *G01J 5/0879* (2022.01);
(Continued)

(58) Field of Classification Search
CPC .... G01J 5/0831; G01J 5/20; G01J 5/53; G01J 2005/202; G01J 5/08021; G01J 5/0803;
(Continued)

(56) References Cited

U.S. PATENT DOCUMENTS 4,222,663 A   9/1980 Gebhart et al.
4,579,461 A   4/1986 Rudolph
(Continued)

FOREIGN PATENT DOCUMENTS

CS              244714 B1 *   8/1986

OTHER PUBLICATIONS

Kano et al., Arc temperature measurement with microsecond spectroscopic measurement, 2020, Electr Eng Jpn. vol. 210, pp. 29-36. (Year: 2020).*

(Continued)

*Primary Examiner* — Christine S. Kim
(74) *Attorney, Agent, or Firm* — HARNESS, DICKEY & PIERCE, P.L.C.

(57) ABSTRACT

The present disclosure relates to a system for sensing temperature changes on a microsecond scale. The system uses a multi-channel pyrometer that works in the NIR spectrum to receive thermal radiation. Each channel includes an interference filter tuned to pass thermal radiation within a specified wavelength range, and a detector. Each detector detects thermal radiation focused on it. Each channel further includes an interference filter which reflects thermal radiation which does not pass through it to a subsequent downstream interference filter of a subsequent channel. Each subsequent interference filter is oriented to reflect the thermal radiation not passing through it to a next downstream one of the subsequent interference filters. A subsystem is included for receiving the output from the detectors and determining sensed temperature data there- (Continued)

from, allowing measurement of temperatures down to 800 K.

19 Claims, 8 Drawing Sheets

(51) Int. Cl.
 *G01J 5/0802* (2022.01)
 *G01J 5/0803* (2022.01)
 *G01J 5/20* (2006.01)
 *G01J 5/53* (2022.01)
(52) U.S. Cl.
 CPC . *G01J 5/20* (2013.01); *G01J 5/53* (2022.01); *G01J 2005/202* (2013.01)
(58) Field of Classification Search
 CPC ...... G01J 5/0806; G01J 5/0808; G01J 5/0846; G01J 5/0881; H01L 27/1446; H01L 31/02019; H01L 31/02165; H01L 31/02327; H01L 31/028; H01L 31/03046
 See application file for complete search history.

(56) References Cited

U.S. PATENT DOCUMENTS

| | | | |
|---|---|---|---|
| 2004/0227928 A1 | 11/2004 | Bonne et al. | |
| 2006/0077394 A1* | 4/2006 | Suzuki | G01J 5/0003 356/479 |
| 2010/0292951 A1 | 11/2010 | Gaertner et al. | |
| 2011/0292965 A1 | 12/2011 | Mihailov | |
| 2012/0201267 A1* | 8/2012 | Patalay | G01J 5/12 374/1 |

OTHER PUBLICATIONS

Montgomery et al., A Simple and Portable Multi-Channel Pyrometer Allowing Temperature Measurements down to 800 K on the Microsecond Scale, Feb. 16, 2018, Lawrence Livermore National Laboratory, pp. 1-18. (Year: 2018).*

Gardner et al., Induced-transmission interference-filter array for multiwavelength pyrometry, Apr. 1, 1982, Applied Optics, vol. 21, pp. 1259-1261. (Year: 1982).*

International Search Report and Written Opinion regarding International Application No. PCT/US2019/031957, dated Sep. 11, 2019.

* cited by examiner

Table 1

| Channel | Center Wavelength (nm) | Bandpass (nm) | Signal (V) / Background at 1319K (1046C) | Signal (V) / Background at 806K (533 C) | Detector |
|---|---|---|---|---|---|
| 1 | 1290 | 80 | 0.077 / 0.000 | 0.001 / 0.001 | Ge |
| 2 | 1400 | 80 | 0.049 / 0.000 | 0.000 / 0.000 | Ge |
| 3 | 1485 | 30 | 0.041 / 0.000 | 0.000 / 0.000 | Ge |
| 4 | 1585 | 50 | 3.136 / 0.813 | 0.755 / 0.704 | Ext. InGaAs |
| 5 | 1730 | 45 | 3.051 / 1.106 | 1.000 / 0.963 | Ext. InGaAs |
| 6 | 1900 | 80 | 3.974 / 1.199 | 1.158 / 1.097 | Ext. InGaAs |
| 7 | 2200 | 30 | 1.241 / 1.232 | 1.068 / 1.064 | Ext. InGaAs |

SYSTEM AND METHOD FOR MULTI-CHANNEL PYROMETER ALLOWING NON-CONTACT TEMPERATURE MEASUREMENTS DOWN TO 800 K ON THE MICROSECOND SCALE

CROSS-REFERENCE TO RELATED APPLICATIONS

This application claims the benefit of U.S. Provisional Application No. 62/698,657, filed on Jul. 16, 2018. The entire disclosure of the above application is incorporated herein by reference.

STATEMENT OF GOVERNMENT RIGHTS

The United States Government has rights in this invention pursuant to Contract No. DE-AC52-07NA27344 between the U.S. Department of Energy and Lawrence Livermore National Security, LLC, for the operation of Lawrence Livermore National Laboratory.

FIELD

The present disclosure relates to pyrometers, and more particularly to a multi-channel pyrometer able to make non-contact, low temperature measurements on a microsecond scale.

BACKGROUND

This section provides background information related to the present disclosure which is not necessarily prior art.

The measurement of transient temperatures less than about 1000 K for small samples on the order of about $\frac{1}{1000}$ inch (i.e., about 25 μm), for example using diamond anvil cells, is especially challenging. Such systems typically employ photomultiplier tubes requiring power supplies producing several hundred volts, and detectors that operate in the visible spectrum for a majority of the time. A discussion of the state of the art is available in Zhang et al., "*Fast temperature spectrometer for samples under extreme conditions*," Review of Scientific Instruments 86, 013105 (2015) received by RSI on Jul. 1, 2014 published Jan. 13, 2015 and references therein. Such previously developed measurement systems as described in Zhang et al., have also generally not been portable.

Especially challenging are measurements of fast events at low temperatures that suffer from low light conditions and/or low emissivity. For these types of measurements, fast pyrometers based on several optical channels feeding into photomultiplier detectors have been developed, especially for studies of materials under shock conditions, as noted in Zhang et al. Most of these types of systems take advantage of fiber-optic strands feeding into optical systems equipped with photomultiplier tubes with nanosecond rise times.

Another difficult challenge is presented by the small laser-heated samples in diamond anvil cells that often have dimensions of less than 50 micrometer and are heated to low temperatures (<1200 K). An accurate temperature determination via optical techniques in the visible spectrum is then quite difficult since the required exposure times at 1000 K can run 30 seconds or more to achieve decent signal to noise ratios. As a consequence, due to the long exposure time, any fast deviations from the reported average value will remain undetected or willfully ignored. Averaging schemes based on pulsed laser-heating and flash heating have been developed to mitigate these difficulties but they are restricted to high temperatures.

Last, but not least, the safety of such measuring equipment should be considered. As noted above, fast detectors with nanosecond rise times based on photo-multiplier tubes require power supplies running at several hundred volts, or even one thousand or more volts. Accordingly, extra caution is required when operating such measuring equipment.

SUMMARY

This section provides a general summary of the disclosure, and is not a comprehensive disclosure of its full scope or all of its features.

In one aspect the present disclosure relates to a system for sensing temperature changes on a microsecond scale. The system may include a multi-channel pyrometer for receiving thermal radiation, with each channel of the pyrometer including an interference filter tuned to pass thermal radiation within a specified wavelength range, and a detector. Each detector operates to detect thermal radiation focused on it. Each channel further may include an interference filter operating to reflect thermal radiation which does not pass through the interference filter to a subsequent downstream interference filter of a subsequent channel of the multi-channel pyrometer. Each subsequent interference filter is oriented to reflect the thermal radiation not passing through it to a next downstream one of the subsequent interference filters. A subsystem may be included for receiving the output from the detectors and determining sensed temperature data therefrom.

In another aspect the present disclosure relates to a system for sensing temperature changes on a microsecond scale. The system may include a multi-channel pyrometer for receiving thermal radiation. Each channel of the pyrometer may include an interference filter tuned to pass thermal radiation within a specified wavelength range, and at a specified center wavelength; an objective lens; and a solid-state detector for detecting thermal radiation focused on the detector by the objective lens. Each interference filter operates to reflect thermal radiation which does not pass through it to a subsequent downstream interference filter of a subsequent channel of the multi-channel pyrometer. Each subsequent interference filter is therefore oriented to reflect the thermal radiation not passing through it to a next downstream one of the interference filters. A power supply is included for powering a specific one of the solid-state detectors. An analog-to-digital (A/D) converter is included for receiving an output from the solid-state detector of each one of the channels of the multi-channel pyrometer. An interface subsystem is included for interfacing an output of the A/D converter to a subsystem for analysis and determination of temperature data being sensed by each one of the solid-state detectors.

In still another aspect the present disclosure relates to a method for sensing temperature changes on a microsecond scale. The method may include using a multi-channel pyrometer to receive thermal radiation, and using a plurality of interference filters each tuned to pass only the thermal radiation within a specified wavelength range. The method further includes using a plurality of detectors, each one being uniquely associated with a specific one of the plurality of interference filters, to detect the thermal radiation that passes through its associated said interference filter. The method further includes using each one of the plurality of interference filters to reflect thermal radiation which does not pass through it, to a subsequent downstream interference filter of a subsequent channel of the multi-channel pyrometer, with each said subsequent one of the interference filters being oriented to reflect the thermal radiation not passing therethrough to a next downstream one of the subsequent interference filters. The method further includes converting signals from the detectors to temperature data.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure. Corresponding reference numerals indicate corresponding parts throughout the several views of the drawings. In the drawings:

FIG. 2 is a table showing an example of the output voltages of the detectors of the system of FIG. 1 for a temperature of 1046 C (1319 K) and 533 C (806 K), and illustrating the increased sensitivity of the InGaAs detectors used with the system;

Figure 1:
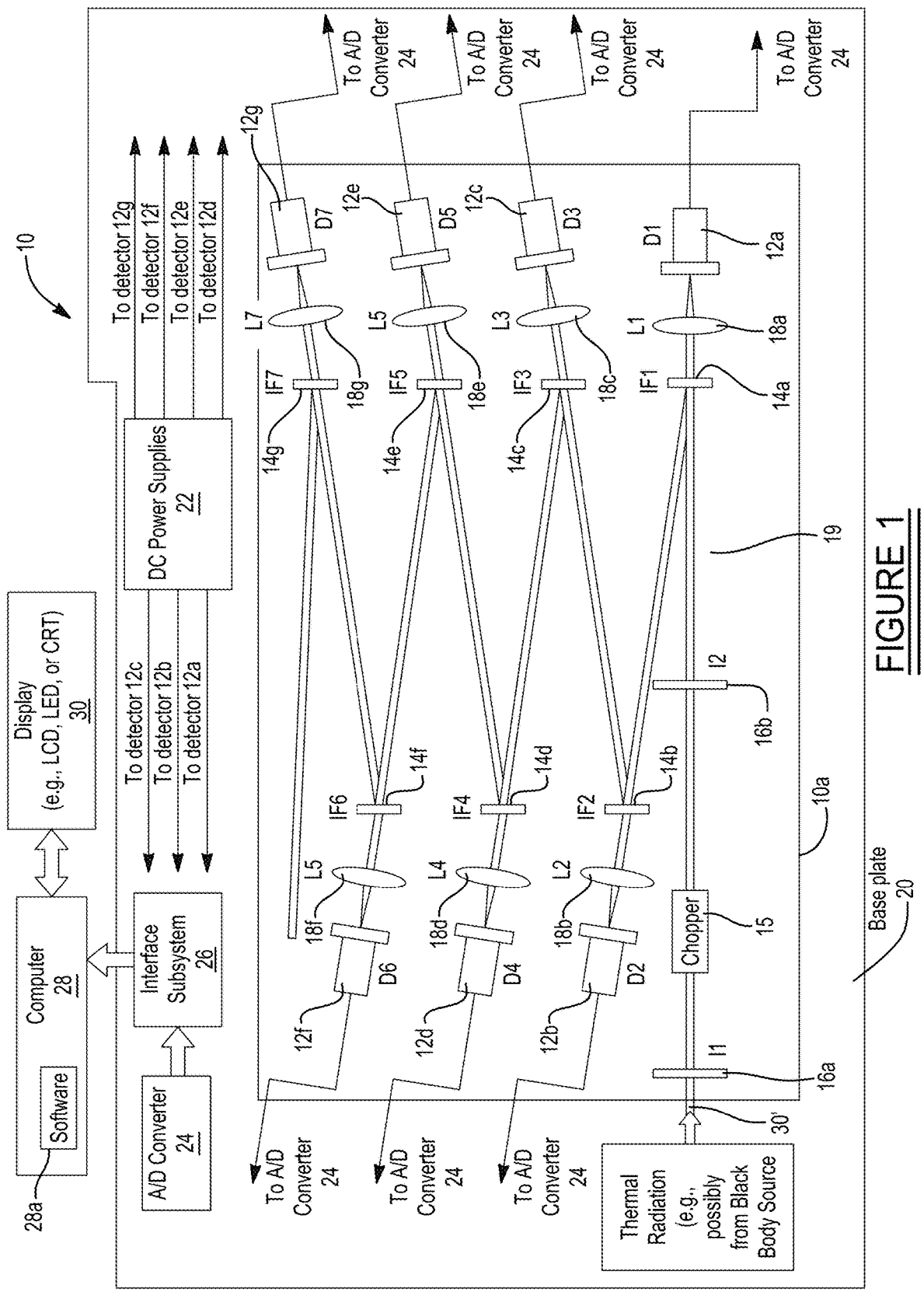
FIG. 1 is a high level block diagram illustrating one embodiment of a system in accordance with the present disclosure.
Figure 4:
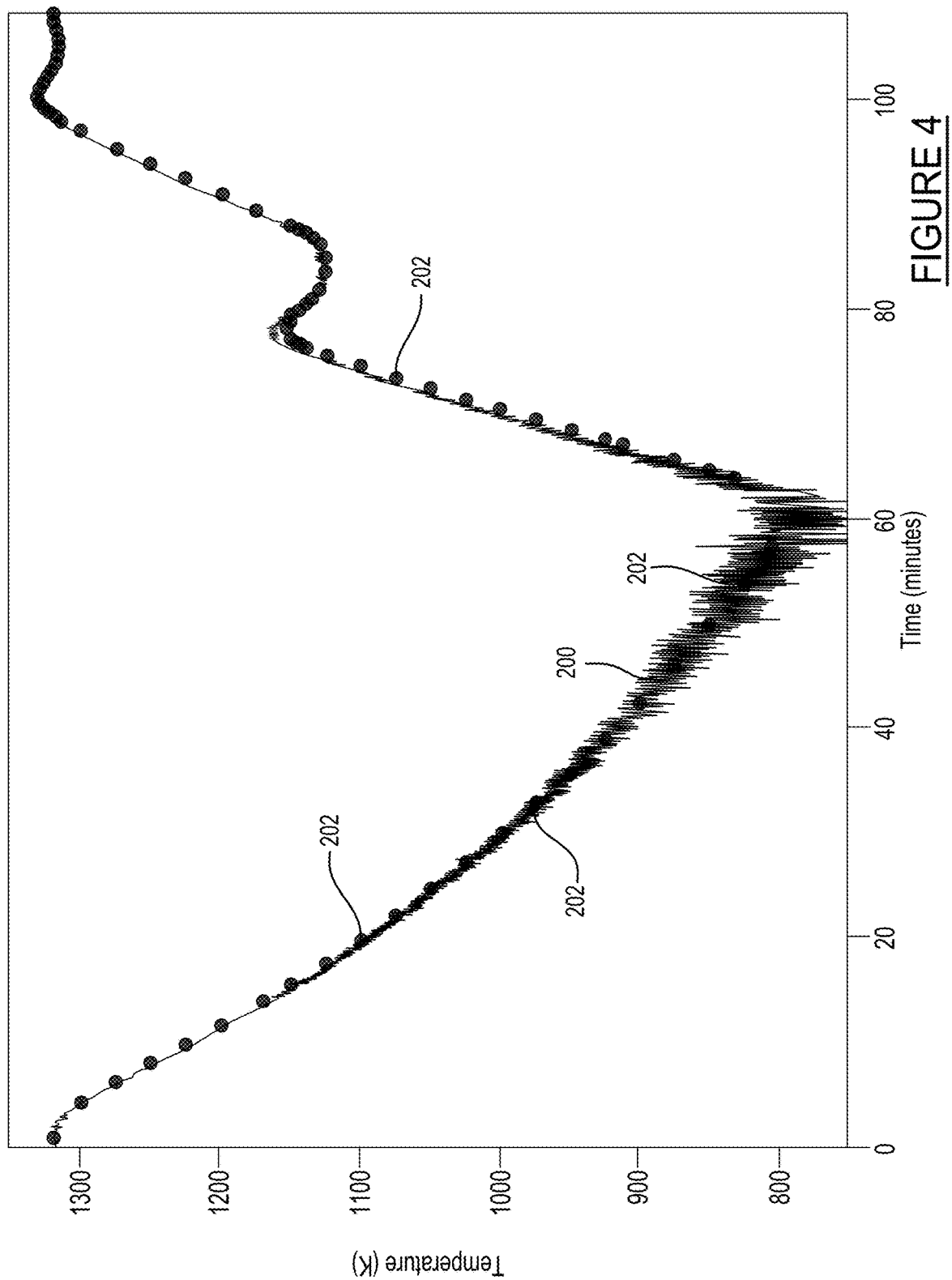
Figure 5A:
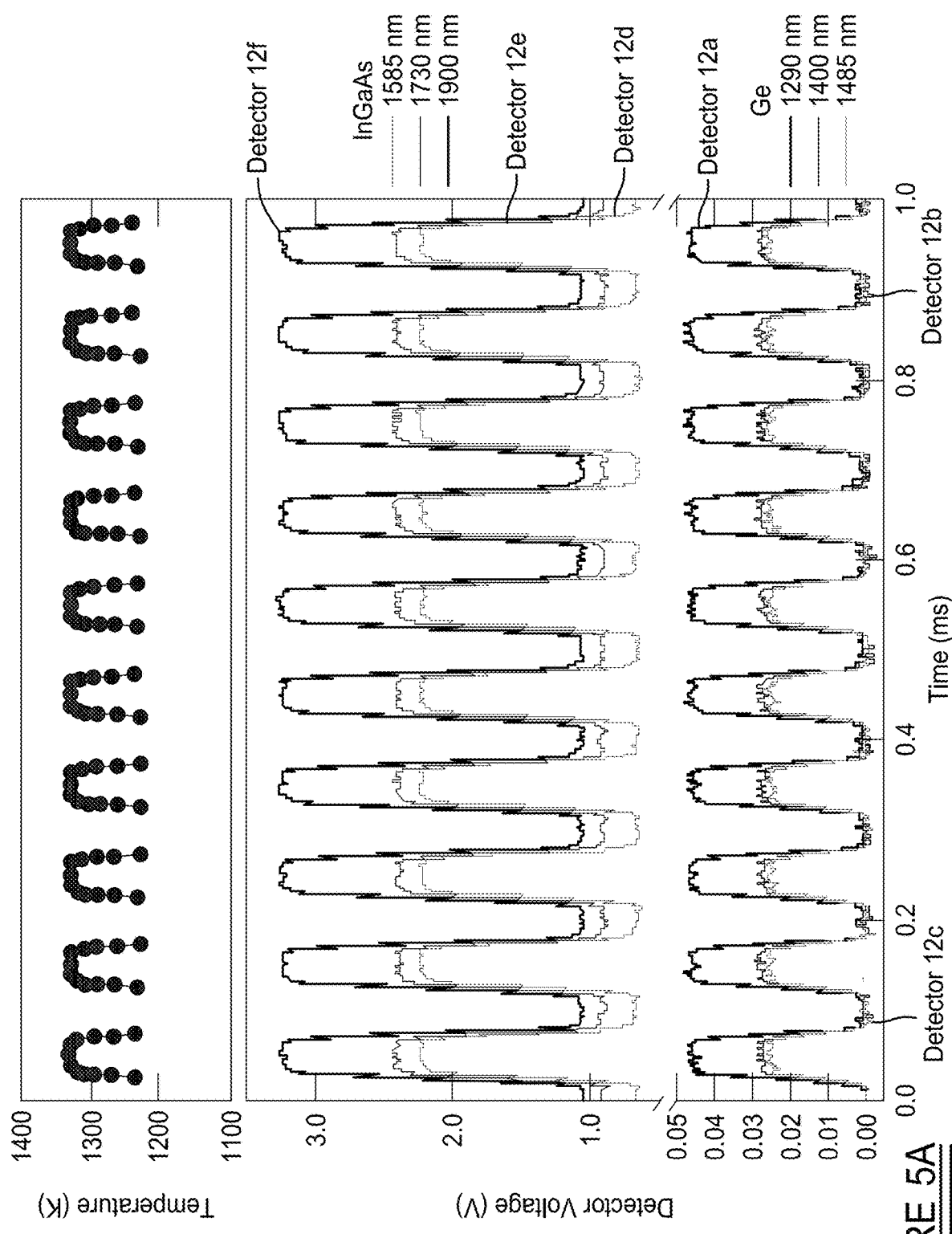
Figure 5B:
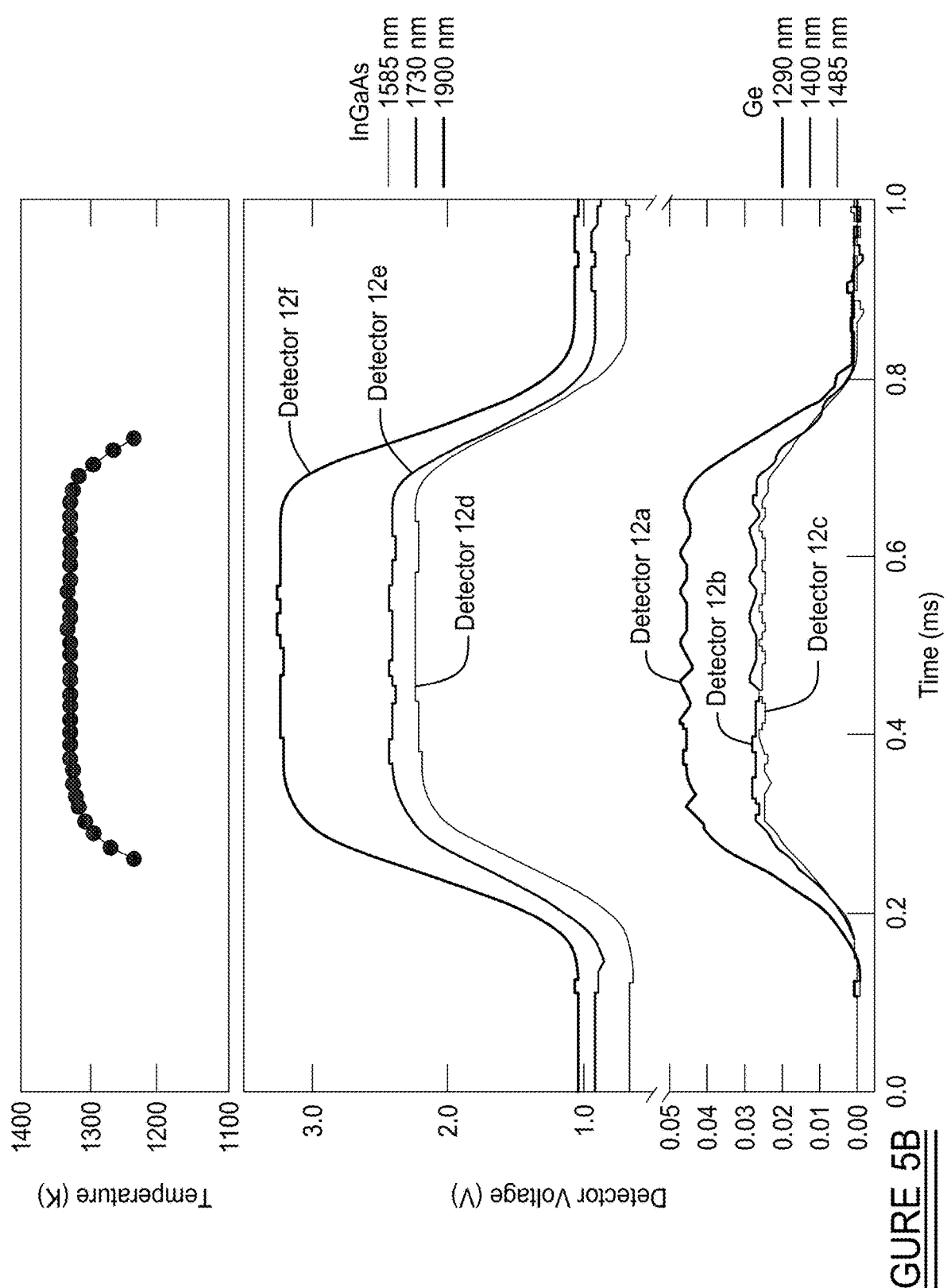
Figure 6:
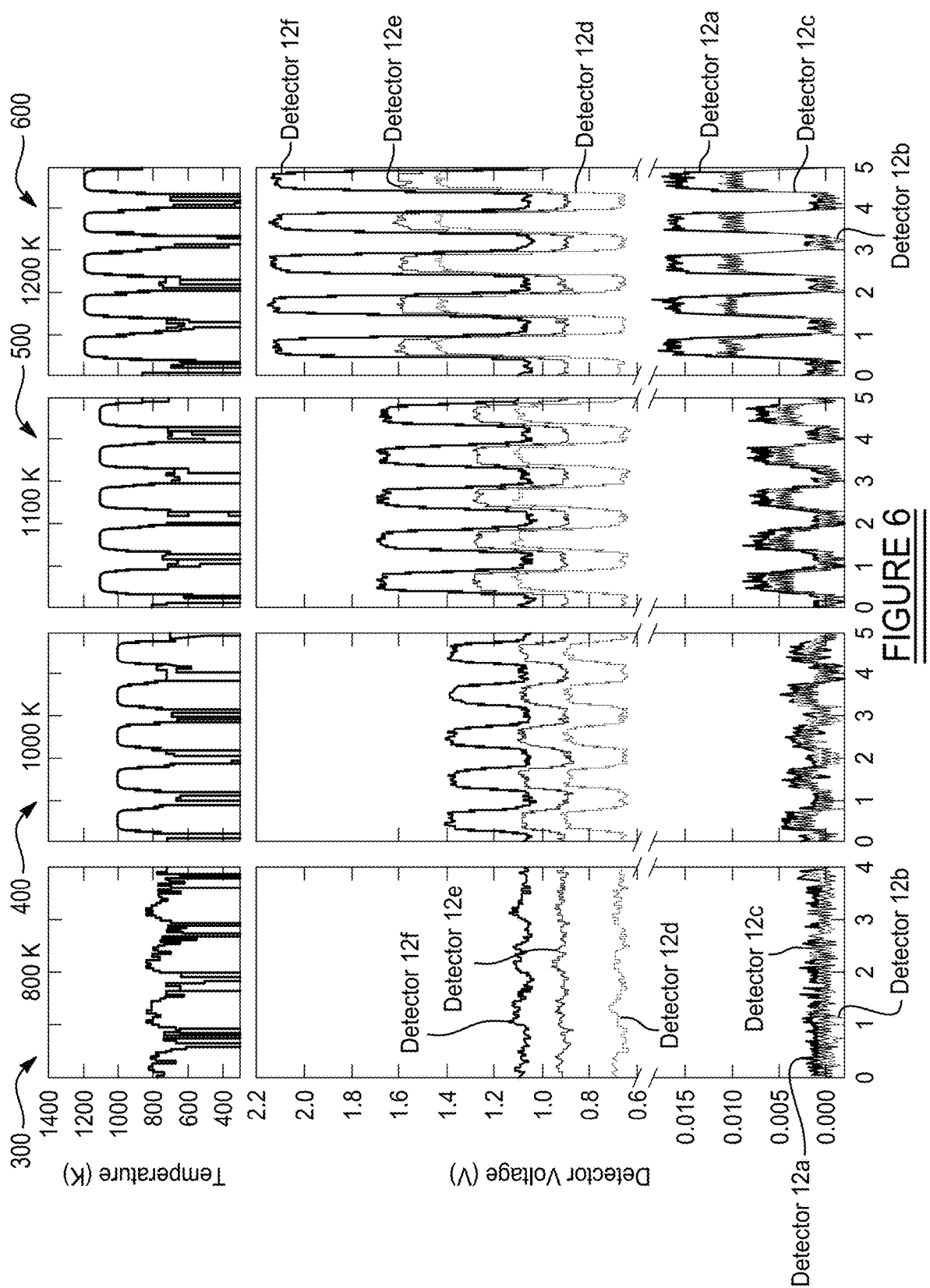
Figure 7:
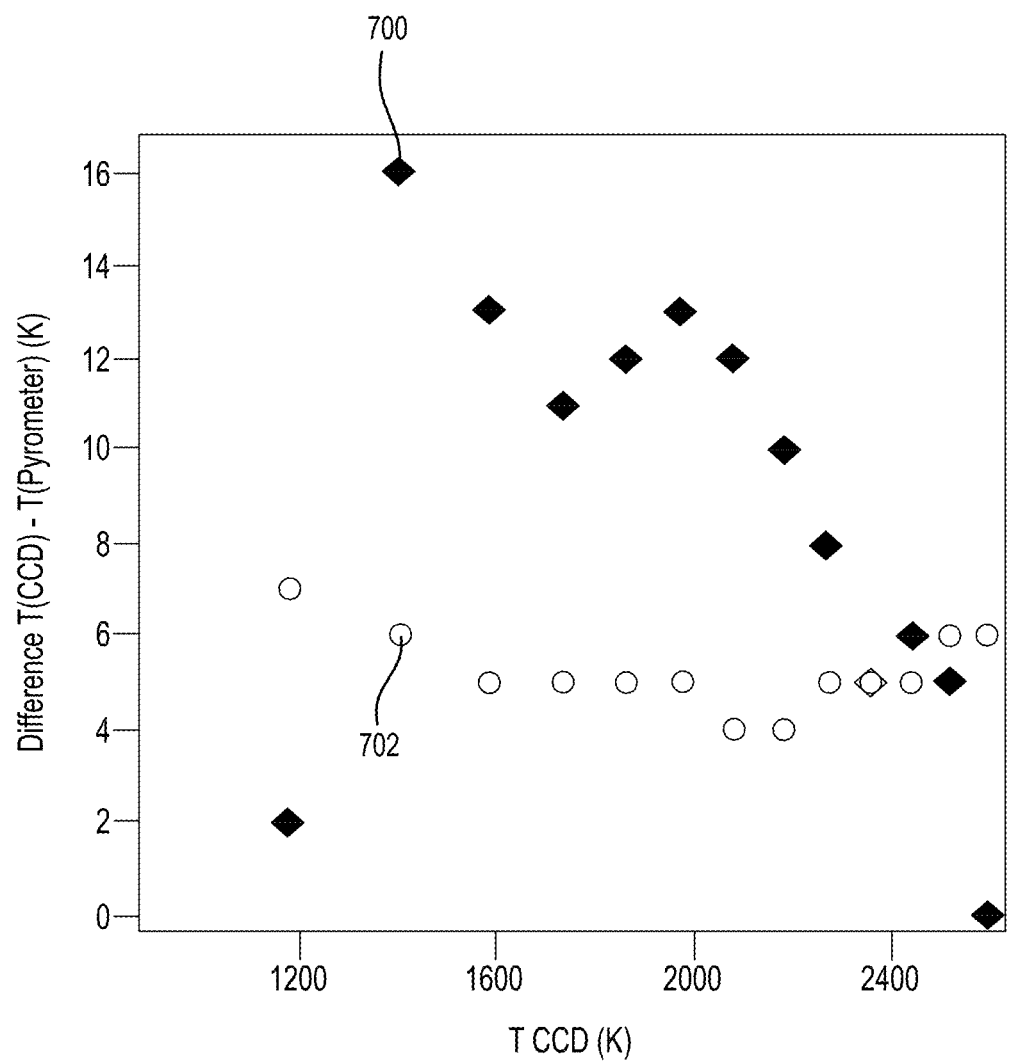

FIG. 4 illustrates a graph showing a continuous temperature readout (shaded portion representing an error envelope) from the pyrometer of the system of FIG. 1 after a calibration at a blackbody temperature of 1045° C. (0.1 second averaging), and where the black circles show the individual temperature readings of the tunable blackbody source, indicating how closely the pyrometer is following the actual temperature measurements of the tunable blackbody source;

FIG. 5A is a graph showing detector voltages and derived temperatures at a chopper rate of 1000 Hz, and where the black body temperature was 1320° K;

FIG. 5B is a graph illustrating that the Ge detectors generate a signal voltage that is about a factor of 50 smaller than that of the extended InGaAs detectors, but the background voltages are essentially zero, whereas the background of the InGaAs detectors is slowly varying and needs to be measured repeatedly;

FIG. 6 shows black body radiation transmitted through a gasket and one anvil of a DAC at different temperatures below 1000 K, demonstrating capabilities of the system of FIG. 1; and FIG. 7 is a comparison of test results of the pyrometer of the present disclosure and a CCD based temperature measurement system.

DETAILED DESCRIPTION

Example embodiments will now be described more fully with reference to the accompanying drawings.

The measurement of temperatures via optical, non-contact methods is a firmly established technique. Such a method takes advantage of the emission of thermal radiation that is solely dependent on the temperature of the area to be probed, with the exception of a wavelength dependent emissivity that most often varies slowly, and thus offers the measurement of unambiguous results. In principle, all temperatures could be determined this way if information about the whole spectrum was available. Typically, however, only parts of the spectrum are known and not every spectral range is suitable for every temperature.

A principal interest of the system and method presented in the present disclosure lies in the determination of phase transitions which are close to 1000 K or lower. In this context, the term "phase transitions" means a variation in the property of a material, for example, going from one crystalline lattice to another, or from a solid into to liquid, and so on. At such temperatures the maximum of the black body curve lies at a wavelength of ~3 µm or higher, and the overall number of photons available is low. While resistive heating of the sample, as performed in designer diamond anvil cells, allows for the necessary long exposure times the experimental effort and cost may be expensive. Accordingly, an important goal of the present disclosure is to work in a wavelength range that contains considerably more photons than the visible part of the spectrum, and with detectors that offer a high sensitivity in this range, namely about 1000-2500 nm. Moreover, diamond is completely transparent in this range. Another goal was to be able to interface a pyrometer with time-resolved X-ray diffraction experiments where the sample is ramp-laser-heated. Additionally, it was planned to keep the number of reflections on optical components inside the pyrometer, such as mirrors and lenses per optical channel, to a minimum and to forgo the use of optical fibers with their inevitable losses at input and output coupling. Similarly, the number of optical components feeding the light into the pyrometer was desired to be as low as possible.

Furthermore, an important objective for the present disclosure is to present a pyrometer having improved safety over previous designs, and preferably which limits all of the supply voltages used to ±12Vdc (for Ge based detectors) or ±15 Vdc (for extended InGaAs based detectors). Preferably, the detectors used are all are solid state detectors and have a suitable diameter active area (e.g., 1 mm) to balance requirements of efficiency of signal collection with consideration for speed and electronic noise (NEP ~0.05 pWHz$^{-1/2}$ for the Ge based detectors, 0.5 pWHz$^{-1/2}$ for the extended InGaAs based detectors). The detectors may be thermo-electrically cooled (−30 C for the Ge detectors, −20 C for the extended InGaAs detectors) for even better versatility, and to avoid the use of liquid nitrogen as a coolant and dewar attachments to the detector heads, which would necessitate additional space requirements. For all practical purposes the detector systems described herein work without a change in the response at least up to a frequency of about 1 kHz, but observations indicate that the actual frequency upper limit may be considerably higher. The signals generated may be sent to a high speed terminal which communicates with a suitable processor, controller or computer. The terminal may take a plurality of different forms, and the present disclosure is not limited to use with any one particular terminal. But merely by way of example, and without limitation, the terminal may comprise a USB terminal, an Ethernet terminal, a General Purpose Interface Bus (GPIB), an RS-232 interface, an RS-488 interface, etc., and any of these options could be used, possibly with a different choice of A/D converter. The interface terminal may probe the voltages at a high rate, for example 70,000 times per second, or possibly even faster. Also, compared to a system based on photomultipliers, with the system and method of the present disclosure, the cost per detector is considerably less.

Referring to FIG. 1, one embodiment of a system 10 in accordance with the present disclosure is shown. The system 10 in this embodiment includes a pyrometer 10a formed by a plurality of solid state detectors 12a-12g, in this example seven total solid state detectors which form seven distinct channels. In this example the first three detectors 12a-12c are based on germanium (Ge) which work in a wavelength range from 800 to 1700 nm. An additional four of the detectors 12d-12g are based on doped (extended) InGaAs, and operate in the wavelength range of 1200 nm to 2500 nm. The pyrometer 10a of the system 10 may also include interference filters 14a-14g, entrance irises 16a and 16b, and objective lenses 18a-18g. The objective lenses 18a-18g may be, for example, Ealing objective lenses. A greater number of interference filters 14 makes for a more precise temperature measurement, and it will be appreciated that a wide variation in the number of filters used is possible.

While the above discussion mentions the use of germanium detectors, it will be appreciated that even more sensitive detectors (e.g., solid state or photomultiplier tube-based, may be used). In fact, the detectors described herein may be comprised of virtually any other type of technology that may become available, so long as the detector fits the requirements of being low-voltage, sensitive in the infrared, and has a comparably small form-factor.

The pyrometer 10a of the system 10 is relatively compact, and the detectors 12a-12g, lenses 18a-18g, interference filters 14a-14g and irises 16a and 16b are able to fit on a circuit board 19 about 12 inches by 24 inches in area. The circuit board 19 may be supported on a base plate 20. The base plate 20 may also support a first plurality of DC power supplies 22, one for each detector 12a-12g, which provide DC power independently to each of the detectors 12a-12g. Optionally, one DC power supply 22 may be used to supply power to the Ge based detectors 12a-12c, while a second independent DC power supply is used to supply power to the InGaAs detectors 12d-12g. An analog-to-digital (A/D) converter 24 receives the analog voltage outputs from each of the detectors 12a-12g via a suitable conductor, for example via a 50 ohm cable, and generates a corresponding digital output signal. The digital output signals from the A/D converter 24 may be transmitted to an interface subsystem 26. In one example the interface subsystem 26 may be a USB interface. However, as noted above, the system 10 is not limited to use with any one particular type of interface subsystem, and it is possible that other types of interface subsystems (e.g., RS-232, RS-422, RS-488, GPIB, Ethernet, etc.) could be implemented. And as also noted above, the type of interface subsystem selected may require a specific type of A/D converter. The interface subsystem 26 may communicate with a processor, controller or computer 28 (for convenience, hereinafter simply "computer" 28) which may include software 28a stored in a non-volatile memory for performing the needed computations to determine temperatures from the measured voltages. The computer 28 may communicate with a display 30 for displaying the temperature data obtained using the pyrometer 10a.

In the embodiment shown in FIG. 1 the computer 28 and display 30 are not part of the system 10. However, another embodiment may incorporate the computer 28 and the display 30 onto the base plate 20, which would obviously necessitate enlarging the base plate. The computer 28 may comprise a modern day laptop, desktop, or possibly even a computing tablet or smartphone, providing the needed coupling with the interface subsystem 26 can be achieved (e.g., by a conventional USB cable). As noted above, the system 10 is not limited to use with any particular form of computer/processor/controller or any particular type of interface.

With regard to the pyrometer 10a, to avoid unnecessary reflections and concomitant losses, the interference filters 14a-14g may be angled slightly from the normal to the optical axis, which will shift their transmission region by about one percent or less. This amount of "shift" will vary with the spacing between the detectors 12 of adjacent channels (e.g., the spacing between detectors 12a and 12b). The entrance irises 16a and 16b denote the two entrance irises for alignment that can also be used to reduce the diameter of an input beam 30' representing thermal radiation. A laser, for example a HeNe laser, may be helpful in defining the optical axis extending through the pyrometer 10a. In principle, the interference filters 14a-14g can be switched rapidly and the pyrometer 10a recalibrated for a different temperature range after a quick realignment with a suitable laser. Experiments were performed with interference filters 14a-14c centered at 850 nm and 950 nm for the Ge detectors, and the InGaAs detectors 14d-14g centered in the 1200-2000 nm region. In the end, a decision was made to select the interference filter configurations listed in Table 1 shown in FIG. 2, which lists the nominal center wavelength and bandpass (FWHM) for each interference filter 14a-14g. In testing, channel 7 was not used since the signal voltage at 2200 nm was extremely low. The germanium detectors 12a-12c are not as responsive as the detectors 12d-12g, which are based on InGaAs, but they do offer a very low and steady/stable background voltage. However, InGaAs detectors 12d-12g were used as part of the system 10 to allow the system 10 to work over a large temperature range. The output voltages of the detectors Ge detectors 12a-12c and those of the InGaAs detectors 12d-12g are listed in Table 1 for temperatures of 1046 C (1319 K) and 533 C (806 K).

For carrying out performance tests, a tunable blackbody source (Graseby-Infrared Systems Development Corp., Winterpark, FL) was used to generate the radiation at a well-defined temperature. The temperature was programmable up to 1050° C. (1323 K). The blackbody radiation (generated in a cavity with an emissivity>0.99) was emitted through a 2.5 mm wide opening, and was collimated by a 32 mm Ealing objective lens (i.e., BK7 lens from Ealing Corp. South Natick, MA; transmission range to beyond 2500 nm), and then sent via two first surface aluminum mirrors (ER.2 silver coated mirrors from Newport Corp.) to another Ealing objective lens that focused the light onto a 50 µm diameter pinhole (the hole was overfilled). The transmitted radiation was picked up by a Mitutoyo NIR objective (20×, M Plan Apo NIR series) on the other side that offers a transmission of at least 50% up to 1800 nm wavelength. The output of the Mitutoyo NIR objective lens was focused at infinity and aligned with two front surface mirrors on the two alignment irises 16a and 16b of the pyrometer 10a. At other times the output was focused onto the second iris 16b inside the pyrometer 10a.

Ideally one will need only an objective lens to pick up the radiation and at most two mirrors to steer the beam into a predetermined path inside the pyrometer 10a. Alternatively, if the pyrometer 10a is interfaced with an existing experimental configuration at a user facility that cannot be altered, one just needs a mobile mirror to intercept the Planck beam and one or more mirrors to steer the beam into the pyrometer 10a, and possibly an additional focusing lens. Once inside the pyrometer 10a, the interference filters 14a-14g select the wavelength region for the individual detector channel or send the radiation on to the next channel. In this way, only a few photons are wasted. One could call this an "almost best-case" scenario in terms of photon collection, but it still demonstrates that the pyrometer 10a is able to measure very low temperatures.

The base plate 20 provides a high degree of portability because of its relatively compact size. In one example, the base plate 20 may have a foot print of about two feet by one foot (about 60 cm×30 cm). The base plate 20 may be made from aluminum or any other suitably strong, relatively lightweight material. The power supplies 22 for powering the detectors 12a-12g may be either secured to the base plate 20 or may have transformers built into a power cable which couple the power supplies to an AC power source. As noted above, each detector 12a-12g preferably has its own DC power supply 22.

An initial optical alignment is achieved by sending a visible light beam through the first two irises 16a and 16b, which in this example are spaced approximately 11" apart. Interference filter 14a (IF1) admits light within transmission region 1 to the detector 12a (D1, forming channel 1). The transmitted light gets focused onto the detector area with the Ealing objective lens 18a (L1), which in this example has a 30 mm focal length (and possibly BK7 glass open to 2500 nm). The spot size of the signal on the detection area of each channel (i.e., each detector 12a-12g) is less than ~100 μm, which ensures that the detector is not being overfilled and that chromatic aberration errors are mitigated. All other light not passing through the first interference filter 14a is reflected to the second detector 12b, and all remaining light that does not pass through the second interference filter 14b is then passed to the third detector 12c, and so on until the light has passed through every detection channel (i.e., through each interference filter 14a-14g). Since the interference filters 14a-14g are tilted from the optical axis to allow for a direct reflection to the next channel, the center wavelength $\lambda_0$ gets shifted somewhat to the new wavelength $\lambda$ according to:

$$\lambda = \lambda_0 / \cos \beta \quad \text{Equation 1)}$$

with β being the angle from normal incidence within the filter.

The distances between the pairs of filters 14a/14b, 14b/14c/14c/14d, 14d/14e, 14e/14f and 14f/14g in this example of the pyrometer 10a are such that β is about 7 degrees, which red shifts (i.e., increases) the center wavelength by less than one percent. As noted above, this value for β may vary depending on the spacing between adjacent detectors 12.

Figure 3:
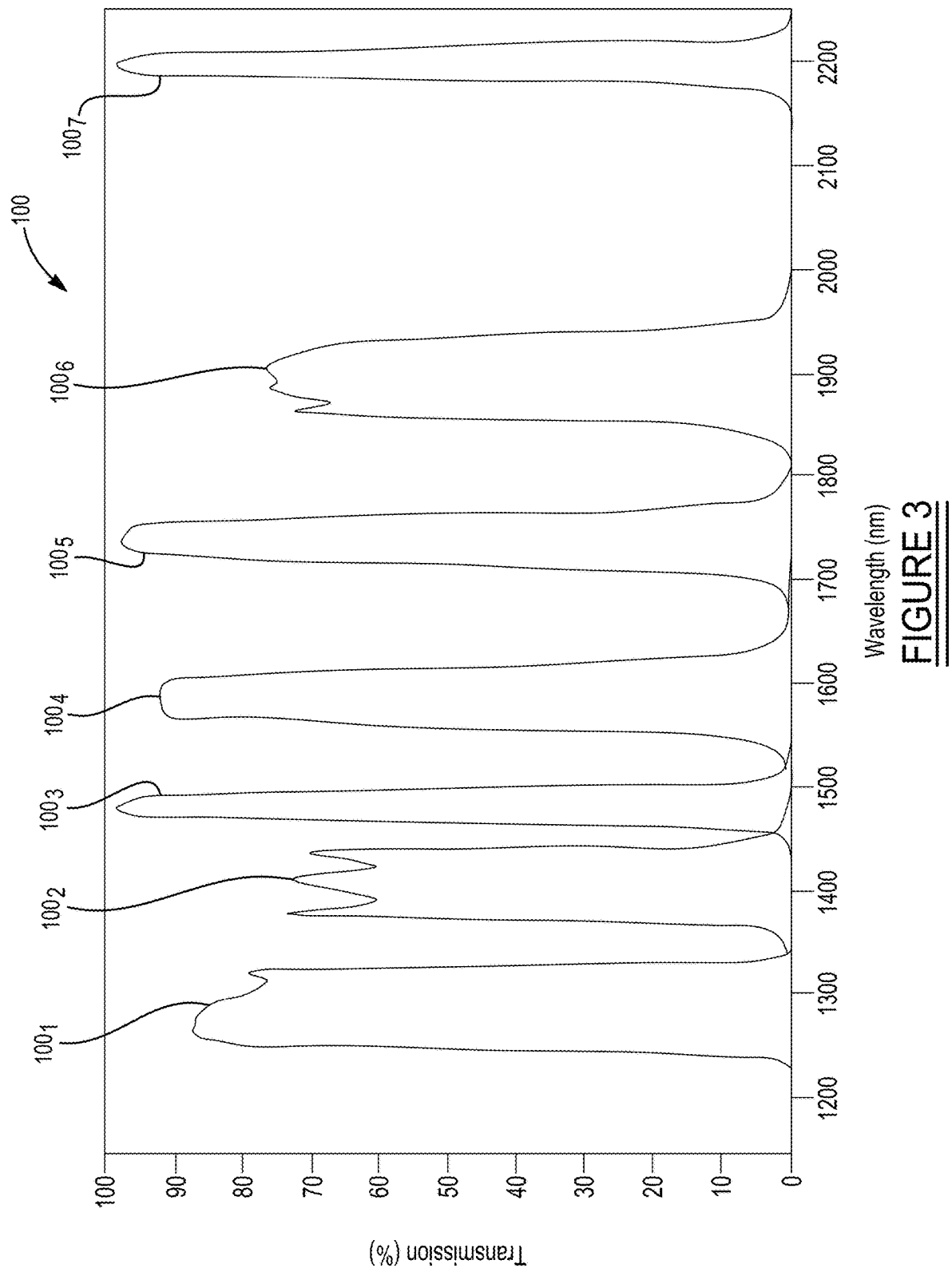
FIG. 3 is a graph showing individual transmission curves for each one of the seven detector channels of the system of FIG. 1.

FIG. 3 shows a graph 100 which contains the individual transmission curves 1001, 1002, 1003, 1004, 1005, 1006 and 1007 for the seven channels of the pyrometer 10a.

The first channel, and hence all subsequent channels, is/are set far from the customary 1064 nm radiation of a laser heating setup to keep the influence of the scattered laser light to a minimum. All interference filters 14a-14g for test/prototype purposes were commercially acquired from commercially available stock to keep initial costs low, which resulted in the slightly unevenly spaced center wavelengths and the bandpasses of different width, as indicated in FIG. 3.

It will be appreciated that the data shown in FIG. 3 can be extremely important in determining accurate temperature information. The specific curves used are not inherent to the operation, and wider, and less-symmetric, and even "square" curves can be used with the present system 10 and its method of operation. All that is necessary is that the filters have minimal overlap and span a broad range across the wavelength range needed for the desired temperature measurement. For high temperatures, this shifts towards the short wavelength, and for low temperatures this shifts towards the longer wavelength. The system 10 also has the capability to consider the bandpass shape as well as simply taking the center wavelength and range. This can be quite important for filters that are very broad in wavelength range.

Temperature Determination

Below the saturation range of the detectors 12a-12g, there is a linear response between the voltage and the fluence incident on each detector. That scaling factor is determined by the calibration, and this calibration can be performed before or after any measurement. The connection from the interface subsystem 26 to the computer 28 feeds the digital voltage values of each channel (i.e., the output from each detector 12a-12g) to the computer 28. The computer 28 may be running a LabView based virtual interface for recording data and determining temperature, as the software 28a. Since the individual detectors 12a-12g have slowly varying background voltage offsets (e.g., the Ge based detectors typically being less than 1 mV, and the extended InGaAs detectors 12d-12g being usually less than or about 1 V) the software 28a regularly closes a remote shutter and acquires a background voltage for each detector that is subtracted from the actual measured output signal from each detector. Temperatures can be calculated by scaling each detector voltage to the expected value of the Planck function:

$$I(\lambda) = \varepsilon(\lambda)/\lambda^5 \cdot 1/[\exp(hc/\lambda k_B T) - 1] \quad (2)$$

with the emissivity ε(λ) kept constant at that temperature for each detector's wavelength, and then performing a weighted Levenberg-Marquardt nonlinear least-squares fit to determine the temperature. It will be appreciated, however, that there are even more sophisticated ways of obtaining more accurate temperatures, for example, for when the filter curves are no longer symmetric and/or square. The present system 10 allows for those calculations as well.

When possible, preferably for all but the fastest collection rates, a measurement of error for each detector 12a-12g may be made by averaging some number of neighboring measurements. This error can be used both to weight each measurement and, if necessary, to exclude them from the fitting process altogether. The detector 12a-12g output voltages can be automatically excluded if the signal minus the error of the measured voltage is less than or equal to the averaged background. Additionally, detectors 12a-12g may be manually excluded from consideration during temperature analysis. Calculation of temperatures may be performed in a separate processing queue so as not to interfere with the data collection. For standard "slow" (e.g., 0.1 second) operation, data may be collected at a rate of 1 kHz, and 100 measurements may be collected and averaged to obtain each point and its associated error. For measurements at 70 kHz, temperatures should be calculated after collection of the voltages, and uncertainties are estimated from a running average.

Calibration and Testing

1. Pinhole as Source of Blackbody Radiation

To test the response of the pyrometer 10a at low temperatures, a tunable blackbody source was used. In the present configuration the pyrometer 10a detects temperature values down to 500° C. in less than 0.001 seconds (see FIGS. 4, 5A and 5B). In fact, this time constraint is imposed by the specific model of A/D converter 24 which was used, and even faster times are likely possible with a more sophisticated/expensive readout system. FIG. 4 illustrates a graph showing a continuous temperature readout, with dark shaded portion 202 representing calculated temperature errors forming an error envelope) from the pyrometer 10a after a calibration at a black body temperature of 1045° C. (0.1 second averaging), and where the black circles 200 show the individual temperature readings of the tunable black body source. This indicates how closely the pyrometer 10a is following the actual temperature measurements of the tunable black body source. Detectors 12a-12g are included or excluded based on the signal-to-noise ratio and a general thresholding value of 1 mV per detector. The pyrometer 10a faithfully follow the temperature of the tunable blackbody source faithfully to ~800° K. Small differences during warming are due to the fact that the pyrometer 10a measures the temperature of the light originating from the exit aperture of the blackbody source, whereas the blackbody source reports the readouts (representing black circles 202) from a thermocouple attached to a different location of the cavity of the blackbody source. At temperatures less than 900 K (630 C), the signals of the Ge detectors 12a-12c no longer contribute, and at the lowest temperatures near 800 K the pyrometer 10a has effectively become a two-channel pyrometer, incorporating the signal from only the 1585 nm and 1900 nm detectors (detectors 12d and 12f, respectively, as noted in FIG. 2).

With brief reference to FIGS. 5A and 5B, detector output voltages for the detectors 12a-12f are shown at a temperature of 1320 K, which may be produced by a chopper wheel 15 as shown in FIG. 1. One period corresponds to 1 ms. The blackbody temperature was 1320 K. The pyrometer 10a in this example is capable of delivering at least one datapoint every 14 microseconds, as shown in FIG. 5B. It will be noted that the Ge detectors 12a-12c generate a signal which is smaller by about a factor of 50 than that of the extended InGaAs detectors 12d-12f. However, the background voltages are basically zero, whereas the background voltages of the InGaAs detectors 12d-12f are slowly varying and need to be measured repeatedly.

Diamond Anvil Cell With Gasket in Place

To test the system 10 with a well-known diamond anvil cell (DAC), one half of a DAC was used with a gasket (130 μm diameter hole) glued onto the anvil instead of the pinhole. The thermal radiation thus has to pass through about a 2.5 mm diamond, encountering reflection losses on the order of 20% before exiting and being collected by an NIR objective. In all other aspects this experimental configuration was the same as described previously with respect to the pyrometer 10a shown in FIG. 1. FIG. 6 shows the outcome when the blackbody radiation is chopped at 1000 Hz at temperatures of 800 K (column 300, –530 C, barely measurable, only the extended InGaAs detectors 12d-12f are delivering signals above the noise level), at 1000 K (column 400, –730 C, the Ge detectors 12a-12c are starting to contribute at 630 C), at 1100 (column 500, –830 C) and at 1200 K (column 600, –930 C). Since the sampling rate of the USB A/D converter 24 used for these experiments was limited to about 70,000 s$^{-1}$ the graphs contain one datapoint approximately every 14 microseconds. At 1000 Hz the individual detector frequency responses do not roll off yet. Faster chopper frequencies—possibly up to 5000 Hz according to the detector specifications—are expected to be possible. If the chopper wheel 15 shown in FIG. 1 is part of the system 10, it will also be practical to use the chopper signal to determine background voltages. The chopper wheel 15, if used, can be inserted anywhere between the objective lens 18a that collects the radiation from the sample and the entrance iris (e.g., iris 16a) of the pyrometer 10a. The chopper wheel 15 may form a well known optical chopper system and essentially operates as fast "on/off" switch for the thermal radiation incident upon it.

Interfacing at the Beamline

Interfacing the system 10 with different experimental optical configurations happens by intercepting the parallel white light beam that originates from the heated source whose temperature needs to be measured. Typically, this "blackbody" radiation gets picked up by an objective lens or other high quality high aperture optic. This beam that is focused at infinity at many facilities gets delivered to the system 10 via several beam steering optics which include at least two mirrors with high reflectivity in the wavelength region of the pyrometer 10a. In this way the incoming beam is aligned to the two irises 16a and 16b at the entrance of the system 10. Once this is accomplished the pyrometer 10a can be calibrated in situ. Alternatively, a previous calibration may be used which, however, might result in slightly less accuracy. Sensitivity of the pyrometer 10a and the working temperature range depend on the quality of the beam steering optics up to the entrance point of the pyrometer 10a (i.e., into iris 16a), among them the objective lens collimating the light. At sector 16 of the Advanced Photon Source at Argonne National Laboratory (HPCAT, 16IDB), the co-inventors have tested the pyrometer 10a by intercepting the collimated beam from a calibrated coil lamp about 1.80 m away from the source with a pick-up mirror on a pneumatically driven stage and delivering the beam to the entrance irises 16a and 16b with three more mirrors, two of which were forming a vertical periscope.

FIG. 7 shows a graph 700 illustrating a comparison between the pyrometer 10a of the present system 10 and a CCD (Charge Coupled Display) based temperature measurement system. The CCD based temperature system required increasing exposure times with decreasing temperature, whereas the pyrometer 10a delivered its values within 0.1 seconds or faster. In this test the pyrometer 10a was calibrated against a light source operating at 2600 K. The light came from a calibrated coil lamp. The difference between the two (represented by grey diamonds 700) is not much larger than the sum of the experimental uncertainties (represented by circles 702). For example, at just slightly under 1200 K, the difference is only about 5 degrees K. The pyrometer 10a exposures were kept at 0.1 seconds throughout. At 1182 K the CCD based system already requires an exposure of 5 seconds for a meaningful S/N ratio and would thus disallow the tracking of the typical "flashing" of a sample, an oscillation of the brightness on a scale faster than a second.

Testing of Temperature Determination of Laser Heated Metallic Samples in DAC and HPCAT An important strength of the current pyrometer 10a design is that it may be calibrated "on the fly" by accepting the temperature of a CCD based system operating in the visible spectrum as a calibration temperature. This temperature should preferably be in a range where the exposure time of the CCD can be kept to about one second or less. At that point the pyrometer 10a is set to deliver values down to 1000 K or less in 1 ms or faster time increments. Specifically, fast temperature changes can be recorded when the sample is flashing. At even lower temperatures and low detector 12a-12g voltages, the individual detector channels will drop out of the fitting routine one by one, but good temperature values can be obtained even with just two detectors. With specific calibrations, only one detector is required for obtaining a temperature value.

The system 10 of the present disclosure thus provides a new pyrometer which delivers significant portability and versatility. The system 10 is somewhat modular, which allows changing the number of detectors 12a-12g, as well as the center wavelength of each detector channel, on the fly. Fast temperature changes at low temperatures down to about 500° C. (820 K) can be reliably detected. The system 10 is expected to find particular utility when used for ramped laser heating. Initially, the pyrometer 10a of the system 10 was expected to operate in a wavelength range from 800-2200 nm, with a wide region around the usual laser heating wavelength region centered around 1050-1070 nm excluded. But since neither Ge nor InGaAs based detectors cover the whole wavelength range, the present system 10 advantageously uses, in one embodiment, a first plurality (e.g., three) of Ge detectors 12a-12c and another plurality (e.g., four) of extended InGaAs detectors 12d-12g. In the course of testing, it was found that decreasing the wavelength range to 1200-2000 nm was beneficial since the signals at less than 1000 nm were too low. Another embodiment of the system 10 may therefore just use extended InGaAs detectors alone due to their superior response.

It will also be appreciated that with the present system 10, the filters are completely interchangeable with the various detectors. Different configurations are sometimes preferable, depending on the temperature one wishes to observe and the signal-to-noise ratio of each detector, which can vary simply due to manufacturing differences between units. As such, the filters can be moved around, as needed, and the data analysis routines (e.g., incorporated in the interface subsystem 26) is designed to allow this to be done as needed.

It will also be appreciated that while the system 10 has been shown with the detectors 12a-12g and their associated components arranged in a serpentine or "zig-zag" like path, that the system 10 may also be constructed with the detectors and their associated components in paths forming different shapes (e.g., a circular path). It is only necessary that the components of one channel be able to receive thermal radiation, and to reflect thermal radiation outside of its filter's bandpass range, on to the next detector of the next subsequent channel, until the last channel is reached.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A system for sensing temperature changes on a microsecond scale, the system including:
    a multi-channel pyrometer configured to operate within a wavelength range of about 1000 nm to 2500 nm, and to receive thermal radiation, each said channel of the multi-channel pyrometer being tuned to operate at a specific wavelength within the 1000 nm to 2500 nm range, each said channel of the multi-channel pyrometer including:
        an interference filter tuned to pass thermal radiation within a specified wavelength range;

a detector for detecting thermal radiation impinging the detector and generating an output;

the interference filter operating to reflect thermal radiation which does not pass through the interference filter to a subsequent downstream interference filter of a subsequent channel of the multi-channel pyrometer, with each said subsequent interference filter being oriented to reflect the thermal radiation not passing therethrough to a next downstream one of the subsequent interference filters, until an interference filter associated with a last one of the channels is reached; and a subsystem for receiving the output from each of the detectors and determining sensed temperature data therefrom;

at least one of the channels configured to operate within a 1000 nm to 1700 nm wavelength range including a detector formed from germanium; and at least one of the channels configured to operate within a 1200 nm to at 2500 nm range including a detector formed from Indium Gallium Arsenide.

2. The system of claim 1, wherein the subsystem comprises:

an analog-to-digital (ND) converter for receiving the output from the detector of each one of the channels of the multi-channel pyrometer; and an interface subsystem for interfacing the output of the A/D converter to a computer for analysis and determination of a temperature being sensed by each one of the detectors.

3. The system of claim 1, further comprising an interface and a computer, the interface interfacing the output to the computer for analysis and determination of a temperature being sensed by each one of the detectors.

4. The system of claim 1, wherein each said channel of the multi-channel pyrometer further comprises an objective lens for focusing the received thermal radiation on a respective one of the detectors.

5. The system of claim 1, further comprising a DC power supply for powering the detectors.

6. The system of claim 1, further comprising a plurality of DC power supplies, with each one of the plurality of DC power supplies being uniquely associated with a specific one of the detectors.

7. The system of claim 1, wherein at least two of the detectors comprises a Germanium, solid-state detector.

8. The system of claim 1, wherein at least two of the detectors comprises an Indium Gallium Arsenide, solid-state detector.

9. The system of claim 1, wherein a first subplurality of the detectors comprise Germanium detectors, and wherein a second subplurality of the detectors comprise Indium Gallium Arsenide detectors.

10. The system of claim 9, wherein the first subplurality of the detectors comprises three Germanium detectors and the second subplurality of the detectors comprises four Indium Gallium Arsenide detectors.

11. The system of claim 10, wherein:

the system forms a seven channel pyrometer;

the three Germanium detectors have center wavelengths of 1290 nm, 1400 nm and 1485 nm; and the four Indium Gallium Arsenide detectors have center wavelengths of 1585 nm, 1730 nm, 1900 nm and 2200 nm.

12. The system of claim 1, further comprising a computer for receiving the output generated by each one of the detectors and calculating temperature related information from each one of the outputs.

13. The system of claim 1, wherein each one of at least a subplurality of the interference filters is supported non-perpendicular to an optical axis of its associated said detector.

14. The system of claim 13, wherein at least a subplurality of the interference filters are supported such that to each is tilted 7 degrees from the optical axis of its associated said detector.

15. The system of claim 1, further comprising a black body radiation source for emitting black body radiation into a first one of the detectors.

16. A system for sensing temperature changes on a microsecond scale, the system including:

a multi-channel pyrometer configured to operate within a wavelength range of about 1000 nm to 2500 nm, and to receive thermal radiation, each said channel of the multi-channel pyrometer being tuned to operate at specific wavelength within the 1000 nm to 2500 nm range, each said channel of the multi-channel pyrometer and including:

an interference filter tuned to pass thermal radiation within a specified wavelength range, and at a specified center wavelength;

an objective lens; and a solid-state detector for detecting thermal radiation focused on the detector by the objective lens;

the interference filter operating to reflect thermal radiation which does not pass through the interference filter to a subsequent downstream interference filter of a subsequent channel of the multi-channel pyrometer, with each said subsequent interference filter being oriented to reflect the thermal radiation not passing therethrough to a next downstream one of the subsequent interference filters;

a power supply for powering a specific one of the solid-state detectors;

an analog-to-digital (ND) converter for receiving an output from the solid-state detector of each one of the channels of the multi-channel pyrometer; and an interface subsystem for interfacing an output of the A/D converter to a subsystem for analysis and determination of temperature data being sensed by each one of the solid-state detectors;

at least a first subplurality of the channels being configured to operate within a 1000 nm to 1700 nm wavelength range, and including detectors formed from germanium; and at least a second subplurality of the channels being configured to operate within a 1200 nm to at 2500 nm wavelength range, and including detectors formed from Indium Gallium Arsenide.

17. The system of claim 16, further comprising a computer, acting as the subsystem, configured to receive the output from the A/D converter and generating the temperature data.

18. The system of claim 16, wherein at least a subplurality of the interference filters are supported non-perpendicular to an optical axis of their associated said solid-state detectors.

19. A method for sensing temperature changes on a microsecond scale, the method including:

using a multi-channel pyrometer having a first subplurality of channels configured to operate within a first wavelength range of 1000 nm to 1700 nm, and a second subplurality of channels configured to operate within a second wavelength range of 1200 nm to 2500 nm;

using the channels of the multi-channel pyrometer to receive thermal radiation;

using a plurality of interference filters each being uniquely associated with a specific one of the first or second subpluralities of channels, and each being tuned to pass only the thermal radiation within a specified wavelength range;

using a plurality of detectors each being uniquely associated with a specific one of the first or second subpluralities of channels, and each further being uniquely associated with a specific one of the plurality of interference filters, to detect the thermal radiation that passes through its associated said interference filter, at least one of the detectors configured to operate in the first wavelength range being a germanium-based detector, and at least one of the detectors configured to operate in the second wavelength range being an Indium Gallium Arsenide-based detector; and further using each one of the plurality of interference filters to reflect thermal radiation which does not pass through it, to a subsequent downstream interference filter of a subsequent channel of the multi-channel pyrometer, with each said subsequent one of the interference filters being oriented to reflect the thermal radiation not passing therethrough to a next downstream one of the subsequent interference filters; and converting signals from the detectors to temperature data.

* * * * *